Jan. 5, 1932.  J. M. HOTHERSALL  1,839,482
METHOD OF MAKING CONTAINER COVERS
Filed Sept. 26, 1929  5 Sheets-Sheet 1

INVENTOR
John M. Hothersall
BY John C. Carpenter
ATTORNEY

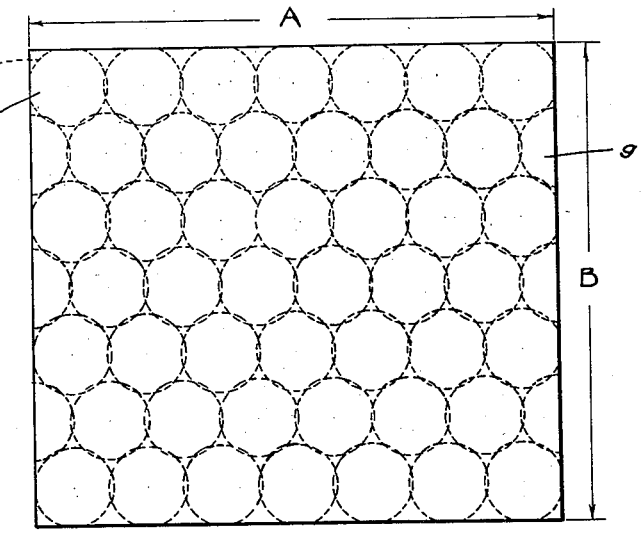
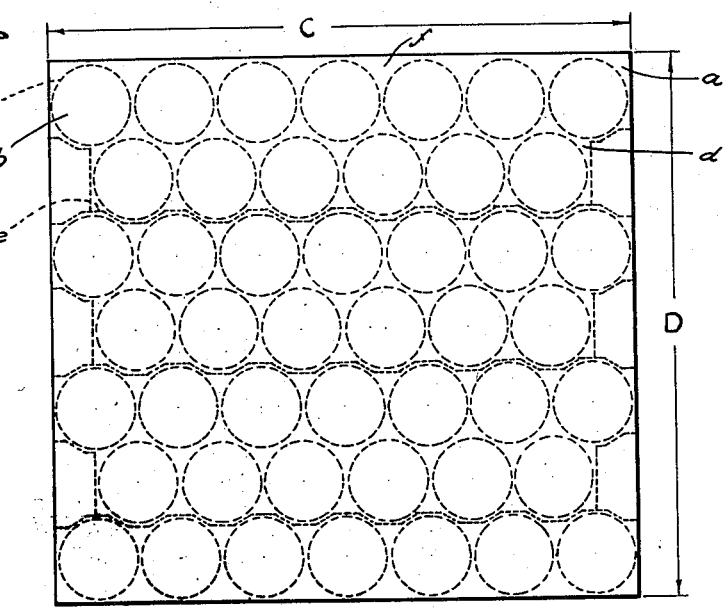
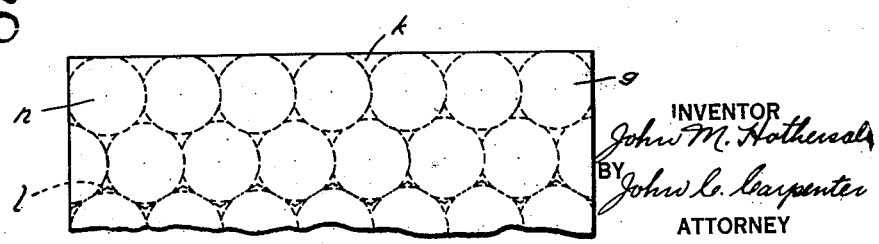

Jan. 5, 1932.   J. M. HOTHERSALL   1,839,482
METHOD OF MAKING CONTAINER COVERS
Filed Sept. 26, 1929   5 Sheets-Sheet 3
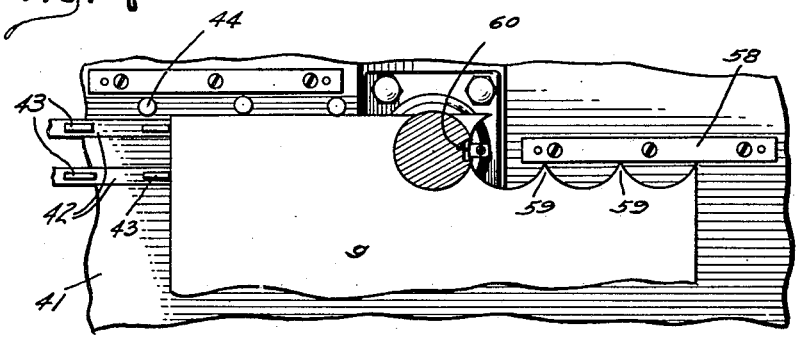
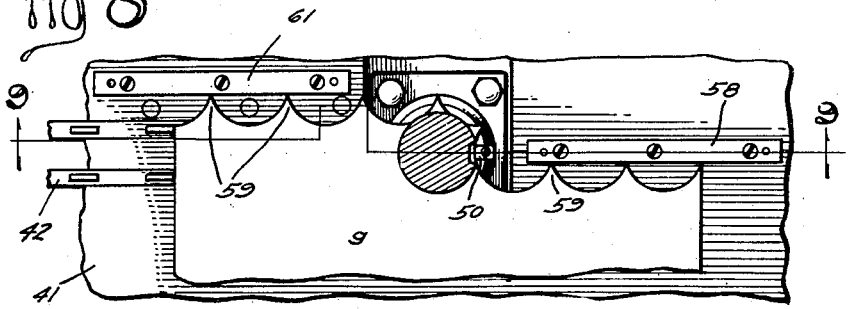
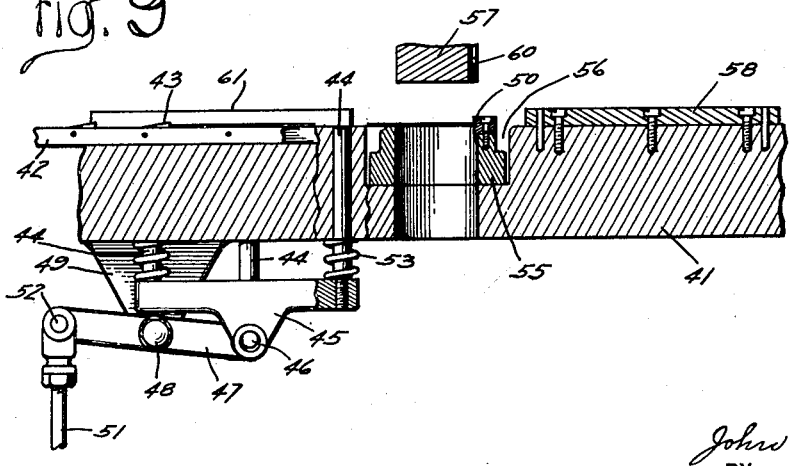
INVENTOR
John M. Hothersall
BY John C. Carpenter
ATTORNEY Jan. 5, 1932.  J. M. HOTHERSALL  1,839,482
METHOD OF MAKING CONTAINER COVERS
Filed Sept. 26, 1929   5 Sheets-Sheet 4
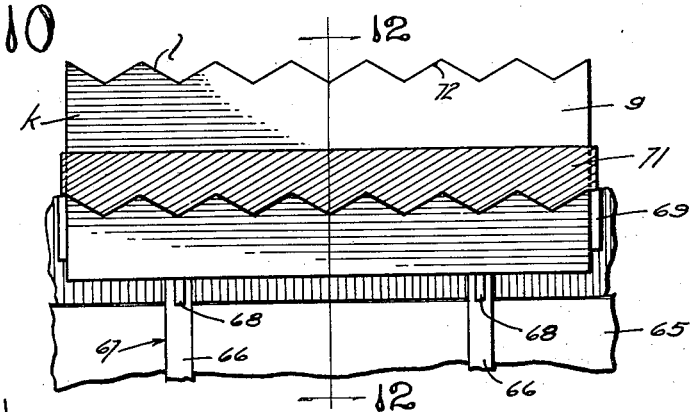
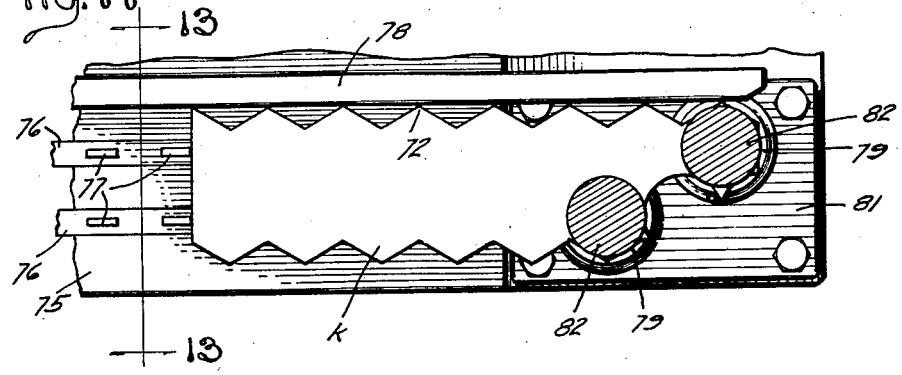
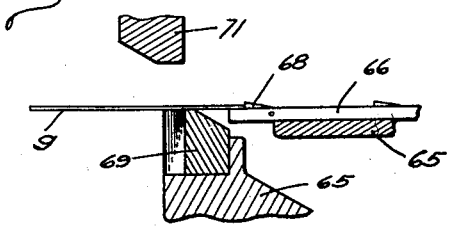
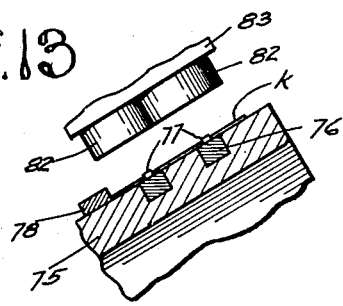
INVENTOR
John M. Hothersall
BY
John C. Carpenter
ATTORNEY Jan. 5, 1932. J. M. HOTHERSALL 1,839,482
METHOD OF MAKING CONTAINER COVERS
Filed Sept. 26, 1929 5 Sheets-Sheet 5

INVENTOR
John M. Hothersall
BY John C. Carpenter
ATTORNEY

Patented Jan. 5, 1932

1,839,482

UNITED STATES PATENT OFFICE

JOHN M. HOTHERSALL, OF BROOKLYN, NEW YORK, ASSIGNOR TO AMERICAN CAN COMPANY, OF NEW YORK, N. Y., A CORPORATION OF NEW JERSEY

METHOD OF MAKING CONTAINER COVERS

Application filed September 26, 1929. Serial No. 395,274.

The present invention relates to a method of forming caps from sheet material by first cutting discs from the sheet and has particular reference to so cutting the disc from which the cap is to be made as to afford the greatest saving of material.

In the manufacture of metal caps having drawn side walls it has been customary to cut a disc, from which the cap is to be made, directly from the sheet or from strips first cut from the sheet. In order that wastage may be reduced to a minimum where the cap is of circular, oval or other non-rectangular shape, these discs are cut by following what is known in the industry as a staggered row layout. In accordance with this lay-out, the outlines of the articles to be cut (that is, the discs) are arranged in rows extending across the sheet, the outlines in each row being staggered with respect to the outlines in the rows immediately above and beneath, so that across the sheet the top and bottom of one outline extends in towards the space between the adjacent outlines of the immediately adjacent rows.

When strips are first cut from the sheet, the severing cut is made along a scroll or undulating line, this providing wide and narrow portions in the strip along each row of spaces from which the discs are to be cut. Because of these undulations and the varying widths accurate arrangement and feeding of the strips in a disc cutting and in a cap forming mechanism, is necessary and these strips are preferably so shaped as to permit accurate feeding by automatic feeding devices.

In using either method of cutting, that is, first, cutting a strip from the sheet and then cutting the disc or cutting the disc directly from the sheet it has been necessary in using present methods to leave sufficient space between each disc in a row and between the edges of each strip to insure the complete outline of disc as it is cut and this has resulted in a remainder after cutting of a skeleton of metal containing the intervening spaces. This necessarily is a waste of material and has made necessary the use of a larger sheet for a given quantity of caps.

The present invention dispenses entirely with the need of a skeleton in cutting and avoids leaving a space between adjacent discs in a row and between edges of strips when strips are produced. This saving is accomplished by the overlapping of the outline of each disc, relative to adjacent discs, as it is cut from the sheet or from the strip, thus utilizing all of the available metal and permitting the use of a smaller sized sheet.

The principal object of the invention is the provision of means for producing metal caps from sheet material by a method of cutting which effects a substantial saving of material.

An important object of the invention is the provision of a method of removing discs from a sheet of metal wherein each disc is cut with the same mechanism and wherein the cutting outline of each disc overlaps the cutting outline of a previously cut disc thereby providing discs with irregular edges.

An important object of the invention is the provision of a method of first cutting a sheet of metal into strips containing adjacent rows of cap providing spaces and thence automatically feeding the strip so cut through a cutting mechanism for removing a disc to be subsequently formed into a metal cap, the removing of the disc from the strip, also cutting away the entire portion of the strip at that place.

A further important object of the invention is the provision of a method of cutting and forming metal caps from sheet material by first producing a cap having an irregular edge and later re-shaping or re-forming the edge to completely conceal its irregularity.

An important object of the invention is the provision of a method of cutting sheet material into strips which are subsequently operated upon by a mechanism to remove material for a cap, the cutting operation entirely removing a portion of the strip at each operation while leaving for gaging purposes, the proper shape and outline of that part of the strip remaining.

A further important object of the invention is the provision of a method of cutting sheet metal and thereby producing drawn caps, this cutting operation providing sufficient gaging edges to permit further proper feeding of the remaining part of the sheet.

Numerous other objects and advantages of the invention will be apparent as it is better understood from the following description, which, taken in connection with the accompanying drawings, discloses a preferred embodiment thereof.

Referring to the drawings:—

Fig. 4 is a plan view of a sheet illustrating in dotted lines the cutting outlines of discs arranged according to a typical present method of cutting, the view showing a layout which embodies strips, each strip containing two rows of cap providing spaces.

Fig. 5 is a plan view of a sheet illustrating in dotted lines the staggered arrangement of the cutting outlines of discs enclosing cap providing spaces in accordance with the method of cutting embodied in the present invention.

Fig. 6 is a view similar to Fig. 5, partly broken away, illustrating the layout of a sheet used in accordance with the present invention when contemplating the initial cutting of the sheet into strip form.

Fig. 7 is a fragmentary plan detail, partly in section, illustrating a typical disc cutting mechanism operating directly on a sheet according to the present invention.

Fig. 8 is a view similar to Fig. 7 illustrating a further cutting operation.

Fig. 9 is a fragmentary longitudinal sectional view taken substantially along the line 9—9 in Fig. 8.

Fig. 10 is a fragmentary plan detail of a typical shearing mechanism for first separating a sheet into strips.

Fig. 11 is a fragmentary plan detail of a typical disc cutting mechanism for operation on a strip in accordance with the present invention.

Fig. 12 is a transverse sectional detail taken substantially along the line 12—12 in Fig. 10.

Fig. 13 is a transverse sectional detail taken substantially along the line 13—13 in Fig. 11.

The present invention contemplates among other important features the method of cutting a sheet to provide discs which are subsequently drawn or shaped into cap form by utilizing steps resulting in the highest economy of cap formation. This method of cutting and the resulting advantages will be more clearly evident by a comparison of Figs. 4 and 5.

Figure 4 illustrates a sheet layout such as is used in present day methods of cutting, the sheet designated as having a longitudinal dimension C and a transverse dimension D. There is shown in dotted lines, for the purpose of illustration, seven rows of circles, alternate rows containing seven individual full circles and intermediate rows containing six individual full circles these being arranged in staggered relation, each circle indicating the extent or outline of a cap providing space. A plurality of cap providing spaces $b$ are thus outlined by circles $c$ each space $b$ being separated from an adjacent cap providing space in the same row and from a space in an adjoining row. When such a sheet is to be first severed into strips, a seven-disc row and an adjacent six-disc row will comprise a strip $d$ outlined by the dotted scroll line $e$. Inasmuch as the circles $c$ are separated from each other and from the edges of the sheet, or from the edges of the strip as the case may be, the discs cut along the circular lines $c$ and removed from the sheet in the cutting operation leave a skeleton $f$ in the strip which is of of no further value for making caps and which, therefore, constitutes a waste of material.

Fig. 5 illustrates a sheet $g$ layout such as may be used in the practice of the present invention, this sheet being designated as having a longitudinal dimension A and a transverse dimension B, and containing the same number and size of cap providing spaces as is contained in the sheet $a$. The sheet also contains the same general disposition of individual cap providing spaces, such spaces $h$ having outlines indicated by dotted circles $j$. In this sheet the outlines of the spaces $h$ are overlapped and it will be evident from a comparison of the two sheets $a$ and $g$ that this method of overlapping of the outlines $j$ permit the use of much smaller dimensions A and B than the corresponding dimensions C and D. Furthermore, in the sheet $g$, there are no remaining skeletons left after removal of the disc to correspond to the skeletons $f$ of sheet $a$.

Where sheet $g$ is to be divided into strips (Fig. 6) the same two adjacent rows of seven and six individual cap providing spaces $h$ are used as were used for the strip $d$ of the sheet $a$, such a strip $k$ having an outline $l$ which is in the form of an undulating scroll line. In other words, the same sheet $g$ has the same dimensions A and B irrespective of whether the sheet is first cut into discs or whether it is first severed into strips.

Figure 1:
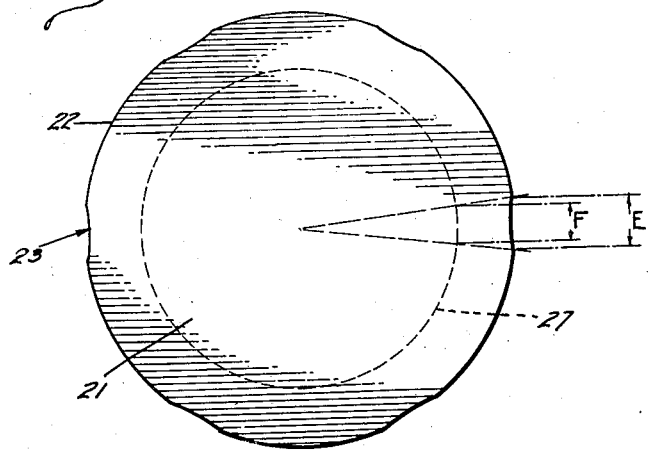
Figure 1 is a plan view of a disc cut from a sheet according to the present invention.

A disc 21 (Fig. 1) obtained from the sheet $g$ and produced according to the present invention has a peripheral edge 22 which will contain three or more irregularities in the nature of clips 23 each of which is a portion of the outline of some cutting outline of an adjacent disc previously cut from the sheet in the straight edge of the sheet itself.

Such a disc 21 in the practice of the present invention is then drawn into cup form to produce a cap shell 24 (Fig. 2) which has a top surface 25 and an annular wall 26. To produce this cap, the outer area of the disc 21 is drawn at a sharp angle to the central portion, the drawing action beginning practically along the dotted line 27 illustrated in Fig. 1. The clips 23 of the disc 21 may be measured in one direction by a chord having the length dimension indicated at E in Fig. 1. During the drawing action this peripheral edge 22 is drawn in and reduced in diameter to the diameter of the circle 27 as embodied in the drawn shell cap 24. In the same proportion the area of the wall 26 adjacent a clip 23 is contracted and its chord dimension E is reduced to the dimension F. In other words, the imperfection or irregularity in the edge 22 occasioned by the clips 23 is minimized and in the drawn shell 24 exist as a smaller irregularity or as clips 28 (Fig. 2).

Figure 2:
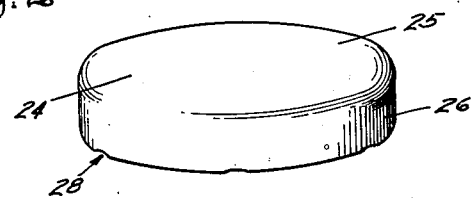
Fig. 2 is a prospective view of a cap shell drawn from the disc of Fig. 1.

For many purposes this cap shell illustrated in Fig. 2 is complete and sufficient as a cap, the slight irregularity occasioned by the clips 28 being of no consequence. Such a drawn cap is suitable for use as a slip cover and for many other purposes.

Where the cap is to be further finished, the edge of the wall 26 of the cap 25 may be further curled as at 31 (Fig. 3) or otherwise bent to completely conceal the clips 28. There is thus formed a curl edged cap 32 having an annular wall 33 and a curled rim or edge 31. Such a cap, while still containing the slight irregularity in its peripheral edge presents the perfect form as a non-clipped cap the imperfection being completely hid in the cap and in no way minimizing its usefulness or value.

The cutting of a sheet g and the passing of the same through the various steps to produce either the cap 24 (Fig. 2) or the cap 32 (Fig. 3) may be accomplished in various types of suitable mechanisms, there being disclosed in the drawings sufficient parts of typical mechanisms for this purpose.

Where the sheet g is directly cut into discs 21, the same may be fed into a cutting mechanism such as is illustrated in Fig. 7. This mechanism comprises a table 41 provided with conventional reciprocating feed bars 42 carrying feeding dogs or lugs 43 for advancing the sheet g over the table 41 in a step by step movement. The outer edge of the sheet during this first cutting action may be guided over the table by a row of guide pins 44 projecting above the table surface, these pins having movement in vertical holes in the table. Each pin 44 extends below the table 41 (Fig. 9) and is threadedly secured to a crosshead 45 pivotally mounted at 46 on a lever 47 pivoted at 48 to a bracket 49 carried by the table 41.

Lever 47 is rocked on its pivot 48 by connection with a rod 51 pivoted at 52 to the lever 47, the rod 51 extending from any suitable operating mechanism for rocking the lever 47 and raising and lowering the pins 44. Springs 53 surround some of the pins 44 and are confined between the crosshead 45 and the table 41 and these tend to hold the pins 44 in the depressed position shown in Fig. 9. When depressed the upper surface of each pin is flush with or slightly below the upper surface of the table 41. This mechanism is provided to permit utilization of the pins 44 as guide members only during the first transverse movement of the sheet g over the table 41 to permit cutting of the first row of discs 21 from the sheet. The remaining part, following each row cutting operation is repeatedly fed across the table 41 until all of the discs are cut and during these subsequent movements, pins 44 do not function as guide members.

The feeding devices 43 advance the sheet g over the table 41 in a step by step movement, and during each rest period of the sheet a disc is cut therefrom. The cutting mechanism comprises a lower die 55 mounted on the table 41 and positioned in a groove 56 formed therein and an upper cutting punch member 57 adapted to be raised and lowered in the usual and preferred manner. As punch 47 is brought down on the sheet g and is moved through the same, it cooperates with the lower die 55 to cut discs 21.

A gage block 50 secured to the forward edge of the die 55 engages an edge of the sheet g prior to each cutting operation and cooperates with the feeding dogs 43 to properly center the work for cutting. The punch member 57 may be slotted as at 60 to allow full clearance between the block 50 and the member 57.

The forward end of the sheet g, after some of the discs in the row are removed, is further gaged by a bar 58 mounted on the table 41. Owing to the manner of cutting, as each disc 21 is removed from the sheet, certain projecting tongues 59 are left in the remaining part of the sheet and it is these tongues that engage the inner edge of the guide member 58 and insure continued proper movement of the sheet g through the machine.

After the first row of discs is cut from the sheet g, what remains of the sheet is again fed through the machine by the feed bars 42 and following the cutting of each row this action is repeated until all of the sheet is converted into the discs 21. During this subsequent feeding of the sheet, the pins 44 are held depressed as illustrated in Figs. 8 and 9 and the sheet passes freely thereover. At such a time certain of the projections 59 engage the inner edge of a guide bar 61 secured to the surface of the table and positioned directly behind the pins 44. This bar guides the sheet at that position and insures proper feeding of the same. At the same time, the projections 59 in the forward end of the sheet engage the guide bar 58, (Fig. 8).

Where strips are first cut from the sheet and subsequently fed in an automatic strip feed mechanism for the cutting of the discs 21, the sheet may first be subjected to a shearing mechanism of a standard well-known type. The principal parts of such a mechanism are illustrated in Figs. 10 and 12 and comprise a table 65 over which the sheet $g$ is moved by reciprocating feed bars 66 moving within slots 67 formed in the table 65 and carrying the usual feed dogs 68. Sheet $g$ is in this manner advanced over the table 65 in a step by step movement and during the periods of rest, it is acted upon by shearing knives comprising a cutting edge 69 carried by the table 65 cooperating with an upper cutting edge 71 mounted in the usual and preferred manner for vertical movement. The sheet $g$ fed through such a machine is separated into the strips $k$ which according to the present embodiment of the invention have projections 72 constituting the scroll line $l$ of the strip.

Such a strip $k$ may then be fed through a suitable disc cutting mechanism, a typical machine of this type being illustrated in part in Figs. 11 and 13. Such a machine comprises a table 75 over which the strip $k$ is advanced in a step by step movement by a suitable feeding device comprising reciprocating feed bars 76 carrying the usual feeding dogs 77. During this advance of the strip $k$ over the table 75, its projections 72 engage the edge of a guide bar 78 carried by the table 75 and this insures the proper straight line movement of the strip through the disc cutting mechanism.

Where disc $k$ embodies two rows of cap providing spaces, as is here contemplated, the cutting mechanism will consist of double die members. For this purpose, lower dies 79 are carried on a die block 81 bolted to the table 75 each of the dies 79 being separated in staggered relation to operate in the proper cap providing space on adjacent rows of the strip. Punch members 82 carried on a suitable head 83 move up and down in proper synchronism with the feeding of the strip $k$ over the table 75 and cooperate with the dies 79 to cut discs 21 from the strip.

Figure 14:
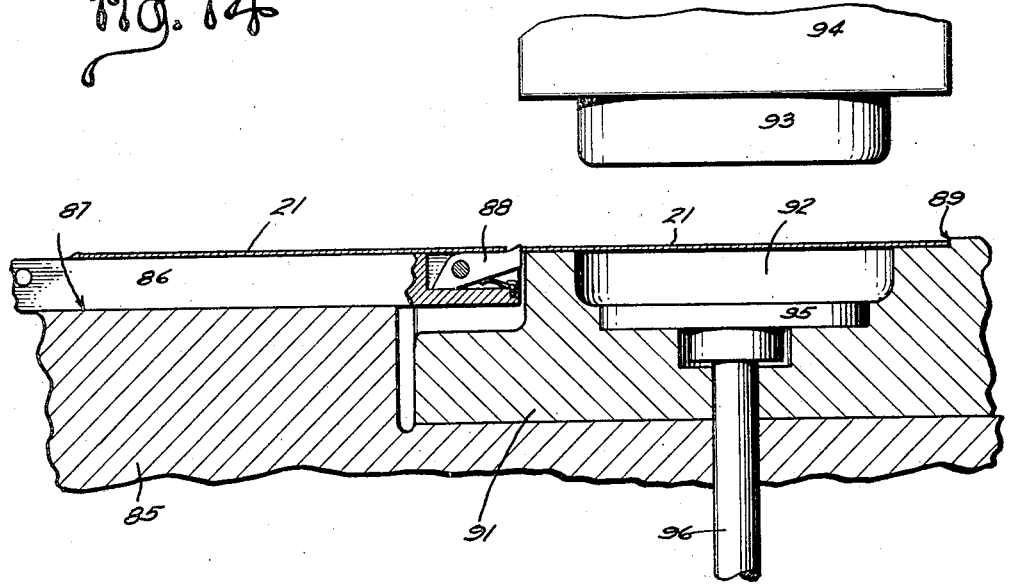
Fig. 14 is a fragmentary transverse sectional view of a typical cap drawing mechanism.

After discs 21 have been obtained from the sheet $g$ according to either of the previously described methods, they may be fed into any suitable drawing mechanism to provide the cap 24 illustrated in Fig. 2. Such a mechanism (Fig. 14) may constitute a table 85 having the customary feed bars 86 moving back and forth in suitable slots 87 formed in the table 85 and carrying feed dogs 88. After the disc 21 is advanced over the table 85 it is brought to rest in an annular groove 89 formed in the upper surface of a drawing die 91 mounted on the table 85.

Figure 3:
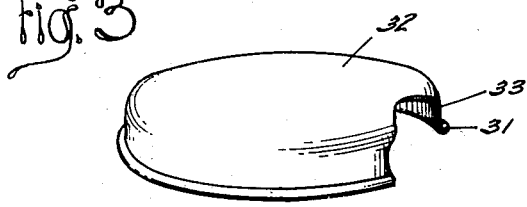
Fig. 3 is a prospective view of a finally completed cap.
Figure 15:
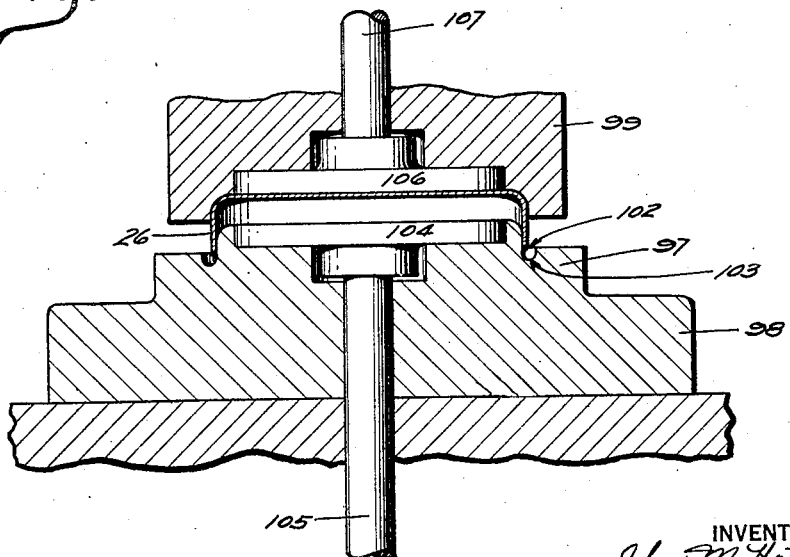
Fig. 15 is a transverse sectional view of a typical cap edge curling mechanism.

Die 91 is provided with a central chamber 92 into which the shell of the cap is moved by a punch 93 carried by a slide 94 positioned in axial alignment with the die 91 and raised and lowered in proper synchronism with the feeding of the disc 21 in the usual and preferred manner. As the drawing punch 93 descends on the disc 21 and forces its center downwardly, the angular outer part is drawn and bent at right angles from its former plane into the vertical wall 26 thereby forming the cap 24 (Fig. 2). Following the drawing action, the cap shell 24 is ejected from the chamber 92 by a knockout pad 95 mounted on a vertically moving stem 96 operated in any suitable manner.

Where a cap of the form illustrated in Fig. 3 is desired, the cap 24 just produced is fed into an edge curling mechanism illustrated in Fig. 15. In this mechanism the shell 24 rests on a die center 97 carried by a die block 98. A punch member 99 which may be carried on the usual type of press slide is mounted in axial alignment with the die center 97 and as it is brought down over the shell 24, it moves the same bodily and forces the lower edge of its wall 26 into a channel 102 formed in the die block 98 adjacent the die center 97. The lower wall of the channel 102 constitutes a curling die member 103 which acts upon the lower edge of the wall 26 to deflect the same outwardly, upwardly and over to form the curl 31 (Fig. 3), this action producing the completed cap 32.

Upon lifting of the punch member 99, following the operation just described, the formed cap 32 is ejected from the die parts 99 and 97. To assist in this ejecting action, there are provided two ejecting devices comprising a knockout pad 104 carried on a vertically moving stem 105 sliding through the die block 98 and a knockout pad 106 carried on a vertically moving stem 107 sliding through the punch member 99.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. The process of producing metal caps from sheet material, which comprises cutting a series of discs from the sheet, the cutting outline of a disc overlapping the edge of the line of severance of the disc previously cut whereby the disc's edge is clipped and irregular, and thence drawing the disc into cup form thereby reducing the said edge irregularity.

2. The process of producing metal caps from sheet material, which comprises cutting a series of discs from the sheet, the cutting outline of a disc overlapping the edge of the line of severance of the disc previously cut whereby the disc's edge is clipped and irregular, thence drawing the disc into cup form thereby reducing the said edge irregularity, and finally shaping the disc's edge to completely conceal the said clipped irregularity.

3. The process of producing metal caps from sheet material, which comprises feeding a sheet in a step by step movement through a blanking mechanism, operating said blanking mechanism while the sheet is at rest to progressively cut a row of discs, the cutting outline of one disc overlapping the cutting outline of the adjacent disc in the row whereby a disc is produced having a clipped irregular edge, and thence feeding the disc through a cap forming mechanism and forming a cap having a clipped irregular edge smaller than the edge of the disc from which the cap is made.

4. The process of producing metal caps from sheet material, which comprises cutting strips from a sheet, each strip including a row of cap providing spaces, thence cutting discs from said spaces, the cutting outline of one disc overlapping the cutting outline of the adjacent disc in the row, whereby the disc has a clipped or irregular edge, thence forming the disc into a cap having an irregular edge, and finally curling the cap edge to conceal its irregularity.

5. The process of producing metal caps from sheet material, which comprises feeding a sheet through a shearing mechanism and cutting strips therefrom, each strip containing a row of cap providing spaces, thence feeding said strips through a cutting mechanism and cutting discs therefrom, each disc being removed from one of the cap providing spaces, the cutting outline of one disc overlapping the cutting outline of the adjacent disc in the row whereby the disc has a clipped or an irregular edge, thence feeding the disc through a drawing mechanism and forming a cap having an irregular edge and finally curling the edge of the cap to conceal its irregularity.

6. The process of producing metal caps from sheet material, which comprises cutting a series of discs from a row of cap providing spaces in the sheet, the cutting outline of each disc overlapping the edge of the outline of the disc adjacent and the cutting of a row of discs entirely removing the row of cap providing spaces leaving a series of projections in the remaining part of the sheet, each disc so produced having a clipped irregular edge, feeding the remainder of the sheet through the cutting mechanism to remove an adjacent row of cap providing spaces, gaging the sheet through the cutting mechanism with reference to said projections, forming the discs into caps having clipped irregular edges, and curling the edges to conceal their irregularity.

7. The process of producing metal caps from sheet material, which comprises laying out the sheet to provide a multiplicity of cap blanks, the normal shape of which cause their outlines to overlap, severing the sheets in accordance with the layout to provide blanks departing from the normal shape as occasioned by the overlapping outlines in the layout, and drawing the blanks into cup form.

8. The process of producing metal caps from sheet material, which comprises laying out the sheet to provide a multiplicity of cap blanks, the normal shape of which cause their outlines to overlap, severing the sheets in accordance with the layout to provide blanks departing from the normal shape as occasioned by the overlapping outlines in the layout, drawing the blanks into cup form, and as an incident thereto reducing the irregularities caused by the overlapping outlines in the layout.

JOHN M. HOTHERSALL.